(12) United States Patent
Dallan

(10) Patent No.: US 11,273,524 B2
(45) Date of Patent: Mar. 15, 2022

(54) APPARATUS FOR LASER OR PLASMA CUTTING OF PIECES OF LAMINAR MATERIAL WOUND IN COIL

(71) Applicant: Dallan S.p.A., Castelfranco Veneto (IT)

(72) Inventor: Andrea Dallan, Castelfranco Veneto (IT)

(73) Assignee: Dallan S.p.A., Treviso (IT)

( * ) Notice: Subject to any disclaimer, the term of this patent is extended or adjusted under 35 U.S.C. 154(b) by 552 days.

(21) Appl. No.: 16/198,212

(22) Filed: Nov. 21, 2018

(65) Prior Publication Data
US 2019/0151998 A1    May 23, 2019

(30) Foreign Application Priority Data

Nov. 23, 2017 (IT) .................. 102017000134202

(51) Int. Cl.
*B23K 26/38* (2014.01)
*B23K 26/08* (2014.01)
(Continued)

(52) U.S. Cl.
CPC .............. *B23K 26/38* (2013.01); *B23K 10/00* (2013.01); *B23K 10/006* (2013.01);
(Continued)

(58) Field of Classification Search
CPC ...... B23K 26/38; B23K 10/00; B23K 10/006; B23K 26/0846; B23K 26/127;
(Continued)

(56) References Cited

U.S. PATENT DOCUMENTS 3,582,466 A * 6/1971 Quirk ................. B23K 26/0846
162/286
3,761,675 A * 9/1973 Mason ................... B23K 26/08
219/121.67
(Continued)

FOREIGN PATENT DOCUMENTS

CN      105965271 A     9/2016
DE      10231032 A1     1/2004
(Continued)

OTHER PUBLICATIONS

Search Report, dated Oct. 25, 2021 in a counterpart Russian Patent Application No. 2018140904(067982) filed Nov. 20, 2018.

*Primary Examiner* — Jimmy Chou
(74) *Attorney, Agent, or Firm* — Cittone Demers & Arneri LLP; Henry J. Cittone

(57) ABSTRACT

An apparatus is provided for cutting pieces from laminar material wound in coil using a laser or plasma cutting machine. In one apparatus according to the invention, a cutting station includes at least one moveable cutting head arranged between the station's entrance and exit, and a means to position a portion of laminar material on a cutting plane. The positioning means includes three separate locking devices, each of which can lock on a portion of the laminar material as it passes through the cutting station. The three locking devices are arranged in succession: the first near the cutting station's entrance, the second near the exit, and the third between the first and second locking devices. At least the third locking device is movable, in the space between the other two devices, along a portion of laminar material while the material is kept under tension.

14 Claims, 3 Drawing Sheets

(51) Int. Cl.
*B23K 10/00* (2006.01)
*B23K 26/12* (2014.01)
*B23K 37/04* (2006.01)
*B23K 26/70* (2014.01)
*B23K 103/16* (2006.01)
*B23K 101/16* (2006.01)

(52) U.S. Cl.
CPC ...... *B23K 26/0846* (2013.01); *B23K 26/0869* (2013.01); *B23K 26/127* (2013.01); *B23K 37/0435* (2013.01); *B23K 26/702* (2015.10); *B23K 2101/16* (2018.08); *B23K 2103/166* (2018.08)

(58) Field of Classification Search
CPC .............. B23K 37/0435; B23K 26/702; B23K 2103/166; B23K 2101/16
USPC ............. 219/121.67, 121.68, 121.69, 121.72
See application file for complete search history.

(56) References Cited

U.S. PATENT DOCUMENTS

| | | | | |
|---|---|---|---|---|
| 4,161,808 A * | 7/1979 | Wittstock | ............. | B23D 35/008 219/121.67 |
| 4,551,912 A * | 11/1985 | Marks | ............... | H01L 21/67144 29/827 |
| 4,623,777 A * | 11/1986 | Aihara | ................... | B23K 26/04 219/121.6 |
| 4,626,651 A * | 12/1986 | Taniguchi | ............. | B23K 26/26 219/121.63 |
| 4,940,880 A * | 7/1990 | Klingel | ............. | B23K 26/0093 219/121.67 |
| 5,006,694 A * | 4/1991 | Handke | ................ | B23K 26/702 219/121.6 |
| 5,049,723 A * | 9/1991 | Macdonald | .......... | B23K 9/0956 219/121.83 |
| 5,182,428 A * | 1/1993 | Jack | ................... | B23K 26/0846 219/121.63 |
| 5,183,598 A * | 2/1993 | Helle | ..................... | B33Y 10/00 264/401 |
| 5,304,773 A * | 4/1994 | Kilian | ................... | B23K 26/04 219/121.78 |
| 5,700,990 A * | 12/1997 | Marlier | ............. | B23K 26/0846 219/121.64 |
| 5,767,480 A * | 6/1998 | Anglin | ................ | H01L 21/4821 219/121.69 |
| 5,942,138 A * | 8/1999 | Toda | .................... | B29C 64/141 219/121.72 |
| 5,994,667 A * | 11/1999 | Merdan | ................. | B23K 26/18 219/121.67 |
| 6,103,989 A * | 8/2000 | Jennings | ................ | B31D 1/021 156/249 |
| 6,273,326 B1 * | 8/2001 | Graf | ..................... | B23P 15/246 228/170 |
| 6,333,482 B1 * | 12/2001 | Sauer | .................... | B21D 51/2669 219/121.63 |
| 6,365,870 B1 * | 4/2002 | Petring | ................ | B23K 26/073 219/121.67 |
| 6,515,253 B1 * | 2/2003 | Battaglia | ........... | B23K 26/0846 219/121.67 |
| 6,563,081 B2 * | 5/2003 | Pace | ................... | B23K 26/0846 219/121.72 |
| 6,624,381 B1 * | 9/2003 | Haffner | ................. | B65H 20/18 219/121.67 |
| 8,471,175 B2 * | 6/2013 | Finn | ................... | B23K 26/0838 219/121.67 |
| 2001/0030180 A1 * | 10/2001 | Pace | ................... | B23K 10/00 219/121.72 |
| 2001/0047704 A1 * | 12/2001 | Adami | ................ | B23D 35/008 83/34 |
| 2002/0043092 A1 * | 4/2002 | Jones | ................ | B23K 26/0846 72/342.1 |
| 2002/0060210 A1 * | 5/2002 | Terada | ............... | B23K 26/0676 219/121.76 |
| 2003/0178397 A1 * | 9/2003 | Jendick | ............... | B23K 26/0846 219/121.69 |
| 2003/0192867 A1 * | 10/2003 | Yamazaki | .............. | B23K 26/08 219/121.78 |
| 2003/0217806 A1 * | 11/2003 | Tait | ........................ | G02B 5/287 156/254 |
| 2004/0108305 A1 * | 6/2004 | Harnisch | ................ | B21D 28/10 219/121.72 |
| 2004/0164062 A1 * | 8/2004 | Horisberger | ....... | B23K 26/1488 219/121.82 |
| 2005/0224476 A1 * | 10/2005 | Ito | ...................... | B23K 37/0426 219/121.82 |
| 2006/0118529 A1 * | 6/2006 | Aoki | ...................... | B23K 26/16 219/121.67 |
| 2006/0219678 A1 * | 10/2006 | Sopori | ................... | G01N 21/55 219/121.72 |
| 2008/0168876 A1 * | 7/2008 | Kilian | ...................... | B26D 7/20 83/424 |
| 2008/0179304 A1 * | 7/2008 | Osako | ................... | B23K 26/38 219/121.85 |
| 2008/0234854 A1 * | 9/2008 | Stark | ....................... | B26D 9/00 700/148 |
| 2008/0314512 A1 * | 12/2008 | Bartsch | ............... | B32B 37/1284 156/258 |
| 2009/0031870 A1 * | 2/2009 | O'Connor | .......... | B23K 26/0846 83/13 |
| 2009/0199950 A1 * | 8/2009 | Kitada | .................... | B32B 41/00 156/64 |
| 2009/0200280 A1 * | 8/2009 | Piantoni | ................. | G01N 22/04 219/121.67 |
| 2010/0043514 A1 * | 2/2010 | Holmquist | ............ | B23K 26/38 72/203 |
| 2010/0084382 A1 * | 4/2010 | Gendron | ............ | B23K 26/0846 219/121.62 |
| 2010/0132526 A1 * | 6/2010 | Wahl | ................... | B23K 37/0461 83/152 |
| 2010/0181165 A1 * | 7/2010 | Finn | ........................ | B23K 26/38 198/339.1 |
| 2010/0206858 A1 * | 8/2010 | Stegemann | .......... | B23K 26/704 219/121.67 |
| 2010/0236997 A1 * | 9/2010 | Varghese | .................... | B07C 3/14 209/584 |
| 2010/0263507 A1 * | 10/2010 | Rozot | .................... | B23K 26/03 83/39 |
| 2010/0301020 A1 * | 12/2010 | Phillip | ................... | B23K 26/38 219/121.44 |
| 2011/0210106 A1 * | 9/2011 | Schaefer | ................. | B23K 26/38 219/121.72 |
| 2013/0037530 A1 * | 2/2013 | Bollegue | ................. | B23K 26/702 219/158 |
| 2013/0270239 A1 * | 10/2013 | Wu | ..................... | B23K 26/0846 219/121.72 |
| 2013/0291375 A1 * | 11/2013 | Virtanen | .......... | G06K 19/07754 29/601 |
| 2013/0319066 A1 * | 12/2013 | Bennett | ................ | B21D 35/001 72/338 |
| 2013/0334739 A1 * | 12/2013 | Miller | .................... | B23K 26/702 264/400 |
| 2014/0014633 A1 * | 1/2014 | Chen | .................. | B23K 26/0846 219/121.67 |
| 2014/0197141 A1 * | 7/2014 | Dorey | .................... | B23K 26/127 219/121.63 |
| 2014/0209574 A1 * | 7/2014 | Walsh | ....................... | B23K 26/40 219/121.39 |
| 2015/0020358 A1 * | 1/2015 | Wu | ........................ | B25J 11/005 29/407.01 |
| 2015/0027999 A1 * | 1/2015 | Yamaguchi | ............ | B23K 37/08 219/121.44 |
| 2015/0060420 A1 * | 3/2015 | Weber | .................... | B31D 1/021 219/121.69 |
| 2015/0129563 A1 * | 5/2015 | Hodges | .................... | B23K 10/00 219/121.44 |
| 2015/0217407 A1 * | 8/2015 | Mitchell | ............ | B23K 26/0846 219/121.72 |

(56) References Cited

U.S. PATENT DOCUMENTS

| | | | |
|---|---|---|---|
| 2015/0352666 A1* | 12/2015 | Fujita | B23K 26/00 219/121.61 |
| 2016/0039049 A1* | 2/2016 | Yang | B23K 37/0408 219/121.72 |
| 2016/0129515 A1* | 5/2016 | Phillip | B23K 9/013 219/121.44 |
| 2016/0214207 A1* | 7/2016 | Okazaki | B23K 26/0838 |
| 2016/0263699 A1* | 9/2016 | Meichsner | B23K 26/0093 |
| 2016/0288257 A1* | 10/2016 | Deiss | B23K 26/0876 |
| 2016/0297036 A1* | 10/2016 | Schmauder | B23K 37/0235 |
| 2016/0308425 A1* | 10/2016 | Bauer | B23K 26/0846 |
| 2016/0311069 A1* | 10/2016 | Deiss | B23K 26/0876 |
| 2018/0079035 A1* | 3/2018 | Watanabe | B23K 26/0604 |
| 2018/0111234 A1* | 4/2018 | Mologni | B26D 7/27 |
| 2018/0126486 A1* | 5/2018 | Dallan | B23K 26/38 |
| 2018/0133838 A1* | 5/2018 | Summerer | B23K 26/0876 |
| 2018/0257177 A1* | 9/2018 | Sato | B23K 26/38 |
| 2019/0045973 A1* | 2/2019 | Gill | A47J 27/04 |
| 2019/0091799 A1* | 3/2019 | Deiss | B23K 37/0288 |
| 2019/0105738 A1* | 4/2019 | Dallan | B23P 21/00 |
| 2019/0151998 A1* | 5/2019 | Dallan | B23K 26/0869 |
| 2019/0217367 A1* | 7/2019 | Klinkhammer | B21D 28/34 |
| 2019/0245231 A1* | 8/2019 | Sousa | H01M 8/1004 |
| 2019/0308275 A1* | 10/2019 | Seitz | B21D 1/05 |
| 2020/0016678 A1* | 1/2020 | Fagan | B23K 37/0288 |
| 2020/0212238 A1* | 7/2020 | Maimon | H01L 31/03926 |

FOREIGN PATENT DOCUMENTS

| | | |
|---|---|---|
| ES | 2604189 A1 | 1/2004 |
| FR | 2233133 B1 | 5/1979 |
| IT | VI20 110 337 A1 | 6/2013 |
| JP | 10137843 A | 5/1998 |
| KZ | 24430 B | 8/2011 |
| RU | 2201858 C2 | 4/2003 |
| RU | 2391194 C1 | 6/2010 |
| RU | 2391195 C1 | 6/2010 |
| RU | 2463146 C1 | 10/2012 |

* cited by examiner

APPARATUS FOR LASER OR PLASMA CUTTING OF PIECES OF LAMINAR MATERIAL WOUND IN COIL

CROSS-REFERENCE TO RELATED APPLICATION

This application claims priority to Italian Pat. App. No. 102017000134202, filed Nov. 23, 2017, the disclosures of which are incorporated by reference herein in their entirety.

FIELD OF THE INVENTION

The object of the present invention is an apparatus for laser or plasma cutting of pieces from laminar material wound in coil.

Advantageously the apparatus according to the present invention is particularly suitable to cut large pieces, i.e. pieces that occupy the laminar material over substantially its entire transverse extension, such as stainless-steel covers for industrial kitchens, panels for refrigerators, panels for aesthetic covers or door panels.

The laminar material that may be processed by the apparatus according to the invention may consist of normal metal sheet or stainless steel, aluminum, copper, brass, and in general all the materials that may normally be processed with laser or plasma cutting machines, coated and uncoated.

BACKGROUND

As is well known, in general, the cutting of pieces from laminar material wound in coil generates three types of components: the machined pieces; the machining swarf; and the residual laminar material, i.e. the laminar material emptied of the machined pieces and swarf. In the description provided hereinafter, the residual laminar material will be referred to more briefly as the "skeleton".

In the case wherein large pieces are produced that occupy the laminar material substantially throughout the transverse extension thereof, the cutting of the pieces does not generate a residue classifiable as a skeleton, but in fact only small and medium-sized swarf.

The separation of the machined pieces from the swarf and the skeleton may be done manually or be partially automated.

Apparatuses for laser or plasma cutting of pieces of laminar material M wound in coil B (in particular, metal sheets) are known in which during the cutting step the laminar material is placed on a movable support structure, consisting of a conveyor belt defined by rods transverse to the direction of advancement of the belt and spaced apart from each other. Each rod has a row of protruding spikes on which the laminar material rests. Such type of conveyor belt is called a "spike bed" conveyor and allows burns on the laminar material (due to the so-called back-flash phenomenon) to be reduced to only the areas of contact between the material and the spikes of the movable support. During the cutting step, the machining swarf slips into the empty spaces of the spike bed conveyor and is thus separated from the machined pieces and the skeleton already during the cutting step. The swarf is thus already collected in the area below the cutting area, while the machined pieces and skeleton (if present) continue to travel together on the spike bed conveyor to be transported to a collection station downstream, outside of the cutting area. Generally, the machined pieces are kept connected to the skeleton by micro-joints, which are then cut downstream.

To completely eliminate the risk of burns, apparatuses for the laser or plasma cutting of pieces of laminar material wound in coils have been proposed, which cut the laminar material while keeping it suspended in the air and therefore do not require the use of conveyor belts of the spike bed type. In such apparatuses, during the cutting step, the laminar material is kept taut in the air, without any lower support, by means of a handling device that slides along the direction of advancement of the laminar material. Such movable device is provided to move the laminar material and to tension it by cooperating with fixed means for locking the laminar material. In this way, any contact between the laminar material and the support during cutting is avoided, thus eliminating any risk of burning.

Operationally, the pieces are not fully cut, but rather micro-joints connecting to the skeleton remain. Once the suspended cutting step is over, the portion of pre-cut material (pieces connected to the skeleton by means of micro-joints) is separated from the not yet machined material (making a transverse cut at the tail portion) to then be extracted from the cutting station by means of the handling device, which grips the head portion of the pre-cut material. Before a transverse cut is made in the tail portion, a comb-type support is inserted underneath the portion of pre-cut material. Such comb support consists of a plurality of rods, parallel to the direction of advancement of the material and spaced transversely. Operationally, such comb support is slidably associated with the aforesaid handling device to move with respect thereto in the direction of advancement between a retracted position, wherein the comb support is not positioned below the pre-cut material, and an extracted position, wherein the comb support is positioned underneath the pre-cut material. Once the comb support is positioned underneath the pre-cut laminar material, the latter is cut at the tail portion and the pre-cut material is then extracted from the cutting area and taken to a downstream collection area. The extraction is carried out by taking the handling device beyond the collection area, so that it carries with it the pre-cut material and the associated comb support. Once this collection area is reached, the handling device releases its hold and the support element is then retracted, allowing the pre-cut material to lie in a collection plane arranged at a lower level than that defined by the movable support element and corresponding to the cutting plane. Such cutting apparatus is described in Italian patent 111409876.

As it is structured, the cutting apparatus described above does not allow the machining of pieces with a longitudinal extension (i.e. along the direction of advancement of the laminar material) greater than the longitudinal extension of the cutting station. Such cutting apparatus is, therefore, not very flexible in managing the format changes of the pieces to be cut, unless there is a cutting station sized in length to be able to process any type of format of pieces to be cut.

There is, therefore, in the sector a need for an apparatus for the laser or plasma cutting of pieces of laminar material wound in coil which, while cutting the laminar material in suspension, allows flexible management of format changes of the pieces to be cut and at the same time remains compact in size.

SUMMARY OF THE INVENTION

Therefore, the main purpose of the present invention is to eliminate in full or in part the drawbacks of the prior art mentioned above, by providing an apparatus for the laser or plasma cutting of pieces from laminar material wound in coil that, while cutting the laminar material in suspension, allows format changes of the pieces to be cut to be flexibly managed and at the same time remains compact in size.

A further object of the present invention is to provide an apparatus for the laser or plasma cutting of pieces of laminar material wound in coil that is easy to manage.

A further object of the present invention is to provide an apparatus for the laser or plasma cutting of pieces of laminar material wound in coil that is simple and economical to manufacture.

BRIEF DESCRIPTION OF THE DRAWINGS

The technical features of the invention, according to the aforesaid objects, are clearly apparent from the content of the claims provided below and the advantages thereof will become more apparent in the following detailed description, made with reference to the accompanying drawings, which represent one or more purely illustrative and non-limiting embodiments, wherein:

DETAILED DESCRIPTION

Figure 1:
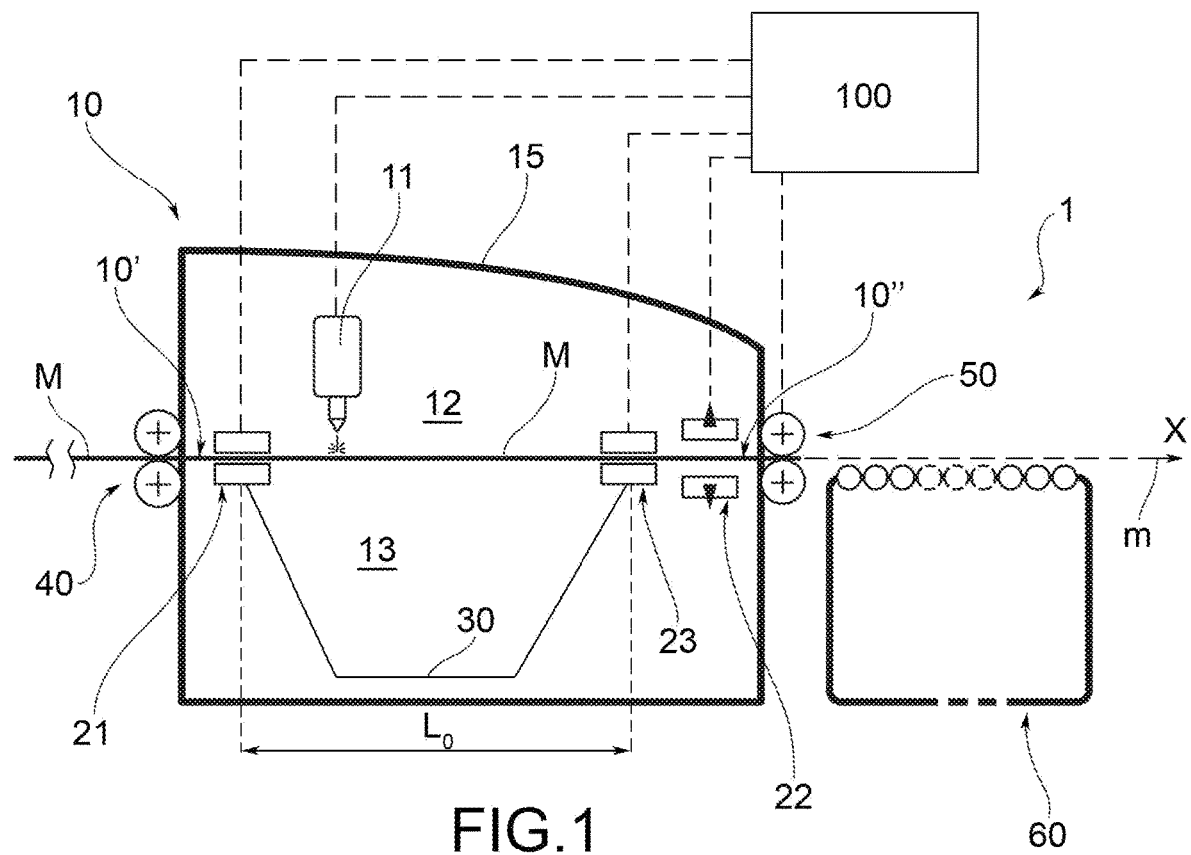
FIG. 1 shows a schematic view of an apparatus for the laser or plasma cutting of pieces of laminar material wound in coil according to a general embodiment of the invention.

The apparatus for the laser or plasma cutting of pieces of laminar material wound in coil according to the invention shall be indicated collectively with 1 in the accompanying figures.

Here and in the description and claims that follow, reference will be made to the apparatus 1 in the condition of use. It is in this sense that any references to a lower or upper position, or to a horizontal or vertical orientation, are therefore to be understood.

According to a general embodiment of the invention, the apparatus 1 comprises a cutting station 10 provided with at least one laser or plasma cutting head 11 that is movable within an operative cutting area 12.

Such operative cutting area 12 is placed between an entrance 10' and an exit 10" of the laminar material in and out of the station 10 along a longitudinal advancement direction X of the material. Such operative area 12 is obtained above a receiving cavity 13 of the cutting swarf T of the laminar material.

Advantageously, the apparatus 1 may comprise a collection tub 30 for swarf arranged at the bottom of the receiving cavity 13. Such collection tub 30 may be removed from the cutting station 10 for emptying.

As an alternative to the collection tub 30 for the swarf T, the apparatus 1 may comprise a conveyor belt arranged at the bottom of the receiving cavity 13. Such conveyor belt may be operated in rotation to continuously extract from the bottom of the receiving cavity 13 the swarf that progressively fall thereon.

The cutting station 10 is preferably equipped with perimeter walls 15, arranged as protection and a shield to the operative cutting area 12.

In particular, the cutting station 10 may be a traditional cutting station (for example, as described in the Italian patent 111409876) and will not be described in detail, since it is well known to a person skilled in the art.

In particular, the cutting station 10 may comprise two or more laser or plasma cutting heads 11. Also, the handling means of the single cutting head 11 or of the plurality of cutting heads (if provided) are of the traditional type and thus will not be described in detail. In the case of a single cutting head, as shown in the accompanying figures, such handling means may consist, for example, of an overhead gantry (not illustrated), to which is slindingly associated the cutting head 11.

Advantageously, the cutting station 10 may also be a cutting station equipped with a spike bed conveyor. For use in the apparatus 1 according to the invention, such cutting station is stripped of the components forming the spike bed conveyor in such a way that no element is placed between the operative cutting area 12 and the underlying swarf receiving cavity 13. Advantageously, such cutting station may then be reconverted to traditional operation by reassembling the spike bed conveyor.

Advantageously, as illustrated schematically in the accompanying figures, the apparatus 1 may comprise upstream of the entrance 10' to the cutting station 10 means 40 for guiding and straightening on the cutting plane m the laminar material M coming from a coil (not illustrated) in the longitudinal advancement direction X of the material. Such means 40 are also known to a person skilled in the art and will not be described in detail.

The apparatus 1 comprises means 21, 22, 23 for positioning a portion of the laminar material M in the aforementioned operative area 12 on a cutting plane m placed above the aforesaid receiving cavity 13.

Operationally, such positioning means 21, 22, 23 are suitable to keep the portion of laminar material M blocked on the cutting plane m during the cutting operations, suspended in the air and longitudinally stretched over the aforesaid receiving cavity 13.

The apparatus 1 further comprises an electronic control unit 100, responsible for controlling the operation of the apparatus 1.

According to a first aspect of the present invention, the aforesaid positioning means comprise three separate locking devices, 21, 22, 23, each of which is susceptible to act reversibly in locking on a transverse portion of the laminar material and of being passed through by a portion of the laminar material placed on the cutting plane.

As shown in the accompanying figures, the aforesaid three locking devices 21, 22, 23 are arranged in sequence along the longitudinal advancement direction X inside the cutting station 10.

A first locking device 21 is arranged in proximity of the aforementioned entrance 10' to the cutting station 10; a second device 22 is arranged in proximity of the exit 10" from the cutting station 10; a third device 23 is arranged between the first and the second locking device 21, 22.

Of such three locking devices 21, 22, 23, at least the aforesaid third device 23 is movable along the aforesaid longitudinal advancement direction X in the space comprised between the first 21 and the second locking device 22.

According to another aspect of the present invention, the apparatus 1 comprises a support structure 60 which is arranged downstream of said cutting station 10 and which defines a support plane for the laminar material leaving the cutting station 10.

According to a third aspect of the present invention, the aforementioned electronic control unit 100 is programmed to coordinate the actuation of the three locking devices 21, 22, 23 in locking and unlocking on the laminar material M, so that a portion of laminar material inside the cutting station 10 may be kept under tension on the cutting plane m by combining the action of the first locking device 21 with the third device 23 or, alternatively, with the second locking device 22. In this way it is possible to free the translation of the third locking device 23 with respect to the portion of laminar material, while keeping the latter under tension.

By virtue of the invention, the third locking device 23 (movable) may be moved within the operative area 12 of the cutting station 10, increasing the operative flexibility of the cutting apparatus 1.

Advantageously, as will be explained in the description below, the third locking device 23 (temporarily released from the function of tensioning the laminar material) may in particular be used as means for dragging the laminar material within the operative cutting area, as well as a supporting element of a portion of machined laminar material, once it has been separated from the rest of the not yet machined laminar material.

The aforesaid "operative freedom" of the third locking device 23 allows format changes of the pieces to be cut to be flexibly managed, without being conditioned by the longitudinal extension of the operative cutting area and while carrying out the cutting of the laminar material in suspension.

Operationally, the freedom of movement of the third locking device 23 in relation to the portion of laminar material placed in the operative cutting area derives from the fact that the tensioning of such portion of material (in cooperation with the first device 21) may be carried out by the second device 22 as an alternative to the third device 23.

In other words, unlike in the solutions of the prior art, the tensioning of the laminar material within the operative cutting area is no longer achieved solely by the intervention of the movable locking device. By virtue of the invention, it is in fact possible to tension the laminar material—or at least prevent it from relaxing excessively so that it bends under its own weight—without using the movable locking device.

The possibility of keeping the laminar material substantially arranged on the cutting plane without excessive bending independently of the third device, makes it possible to slide the third locking device 23 along the same laminar material. If there were no second device 22 to hold the laminar material in place by cooperating with the first locking device 21, i.e. if in the absence of the intervention of the third device, the material could not be tensioned and therefore would bend, the sliding of the third device 23 would in fact be prevented by the same material or at least hindered thereby, with the risk of abrasion and damage to the laminar material.

According to a particularly preferred embodiment of the invention, the electronic control unit 100 is programmed to coordinate the action of the aforesaid at least one cutting head 11, the actuation of the three locking devices 21, 22, 23 and the longitudinal translation movement of the third device 23 in such a way that, in the case wherein the cutting of a piece P having a longitudinal extension L1 greater than the longitudinal extension L0 of the operative cutting area 12 is required, the cutting operations of said piece P are divided temporally into two or more distinct cutting steps.

More specifically, the electronic control unit 100 is programmed in such a way that such distinct cutting steps are carried out in sequence on two or more subsequent longitudinal portions of laminar material, which remain connected to each other in a single body and are sequentially pulled into the operative cutting area and then extracted from that area by means of the third locking device performing a shuttle movement between the entrance 10' and the exit 10".

Operationally, on the forward travel towards the entrance 10', the third device 23 is actuated in unlocking to translate relative to the laminar material, while the other two locking devices 21, 22 are actuated in locking to keep the portion of material taut on the cutting plane m. On the return travel towards the exit 10", the third device 23 is actuated in locking in order to pull the laminar material therewith, while the other two locking devices 21, 22 are actuated in unlocking in order to allow the same laminar material to slide freely on the cutting plane m.

The cutting apparatus 1 according to the invention may therefore cut pieces P having any longitudinal extension, regardless of the extension in length of the operative cutting area 12. In fact, unlike that which is provided in traditional cutting apparatuses, the cutting of a piece P may be distributed over two or more distinct cutting steps, carried out at different times and on different portions of material, but in the same operative cutting area 12.

Advantageously, the shuttle movement of the third device 23 between the entrance 10' and the exit 10" may be complete or partial, in the sense that, depending on the operative needs, the third locking device (movable) 23 may be stopped before arriving near the entrance and/or exit.

Advantageously, the electronic control unit 100 is programmed in such a way that, once the cutting operations on a last portion of the aforesaid piece P (having a longitudinal extension L1 greater than the longitudinal extension L0 of the operative cutting area 12) have been completed, the third device 23 is brought back in proximity of the first device 22 towards the entrance 10' and is here actuated in locking on the laminar material, and the cutting head 11 is activated to perform a transverse cut between the first 21 and the third device 23 so as to separate the aforesaid piece P from the upstream laminar material. Such operative situation is illustrated schematically in FIG. 4.

The electronic control unit 100 is further programmed in such a way that after the aforesaid transverse cut, the third device 23 is translated towards the exit 10" as far as to the second locking device 22 (actuated in unlocking) to push also the aforesaid last portion of the piece P outside of the operative cutting area 12 onto the support structure 60. Such operative situation is illustrated schematically in FIG. 5.

In this way, the third locking device 23 may be used as a support element for the tail portion of the piece P, thus preventing it from bending down under its own weight. This makes it unnecessary to adopt specific means for supporting the pieces within the operative cutting area 12, once they have been separated from the rest of the not yet machined laminar material, arranged upstream. It is the same third locking device 23 to act also as a support element.

Advantageously, the electronic control unit 100 may be programmed in a similar way also for handling pieces with a longitudinal extension no greater than the longitudinal extension L0 of the operative cutting area 12. In other words, regardless of the longitudinal extension of the pieces to be cut, the third locking device 23 may be used as a support element for the portion of laminar material, to prevent it from being arranged cantilevered inside the operative area and bending down under its own weight. Therefore, in this way, in the cutting apparatus 1 according to the invention, it is unnecessary to adopt specific means for supporting the pieces within the operative cutting area 12, once they have been separated from the rest of the not yet machined laminar material, arranged upstream. It is the same third locking device 23 to act also as a support element.

Preferably, the electronic control unit 100 is programmed to coordinate the actuation of the three locking devices 21, 22, 23 in locking and unlocking on the laminar material M and the movement of the third device 23, so that during a cutting step on a portion of laminar material M, the first 21 and the third locking device 23 are both actuated in locking to tension the portion of laminar material in the longitudinal direction and the second locking device 22 is instead actuated in unlocking. In such situation, the third device 23 is arranged in proximity of the second device 22. Such operative situation is illustrated schematically in FIG. 1.

Preferably, the tensioning of the laminar material M functional at a correct cutting operation is obtained by using the first locking device 21 and the third locking device 23.

More specifically, such tensioning is obtained in particular by keeping the first locking device 21 (actuated in locking) longitudinally fixed at one end of the portion of laminar material and by translating in the opposite direction the third device 23, which is actuated in locking at a second end of the portion of laminar material (opposite to the first). The departure of the third device 23 from the first device 21 determines the tensioning of the material M.

The tensioning of the laminar material M carried out using the first 21 and the second locking device 22 may be of a lower intensity than that required to carry out a cutting operation, being essentially aimed only at preventing it from becoming excessively slack so as to bend under its own weight, i.e. to keep the laminar material flat.

Advantageously, the electronic control unit 100 is programmed to coordinate the actuation of the three locking devices 21, 22, 23 in locking and unlocking on the laminar material M and the movement of the third device 23, so that the third locking device 23 is used to drag inside the operative cutting area 12 a free head portion of the laminar material inserted in the first device 21. During such operation, the other two locking devices 21, 22 are both actuated in unlocking to allow the free sliding of the laminar material onto the cutting plane m. Such operative situation is illustrated schematically in FIG. 6.

According to a preferred embodiment of the invention, the cutting apparatus 1 comprises, downstream of the exit 10" from the cutting station 10, means 50 for extracting the laminar material M from the cutting station 10.

Preferably, as schematically illustrated in the accompanying figures, the aforesaid extraction means 50 consist of at least one pair of extractor rollers.

Advantageously, the electronic control unit 100 is programmed to coordinate the actuation of the aforesaid extraction means 50 with the translational movement of the third locking device 23 in such a way that a portion of laminar material pushed to exit from the operative cutting area by the aforesaid third device 23 is maintained substantially coplanar to the cutting plane m by means of said extraction means 50. Such operation facilitates the slide of the laminar material M out of the cutting station 10.

According to a preferred embodiment of the invention, wherein the third locking device 23 consists of at least one clamp 21 slidingly guided parallel to the longitudinal advancement direction X of the material by a support structure of the cutting station 10.

In particular, the third locking device 23 may consist of a plurality of clamps distributed along the transverse extension of the sliding track of the laminar material and joined together in translational movement along the axis X.

According to a preferred embodiment of the invention, the aforesaid first 21 and second locking device 22 are fixed along the longitudinal direction X in the cutting station 10.

In particular, the aforesaid first 21 and second locking devices 22 consist of at least one fixed clamp or a pair of opposing rollers.

More specifically, both the first locking device 21 and the second locking device 22 consist of a single fixed clamp, which extends substantially over the entire transverse extension of the sliding track of the laminar material within the operative cutting area 12.

Alternatively, the first locking device 21 and the second locking device 22 may be one or both movable (possibly even for a limited stroke) parallel to the longitudinal advancement direction X.

Advantageously, the support plane for the laminar material leaving the cutting station 10, defined by the aforesaid support structure 60, is substantially coplanar with the cutting plane m. This prevents the laminar material M from flexing between the outside and inside of the cutting station relative to the cutting plane m.

Preferably, as shown schematically in the attached figures, the support structure 60 arranged downstream of the cutting station 10 consists of a roller table.

Advantageously, the support structure 60 arranged downstream of said cutting station 10 has a predefined longitudinal extension according to the extension in length of the pieces P to be processed in the cutting apparatus 1. In particular, the support structure 60 may have a longitudinal extension equal to the extension in length of the piece P having the greater extension in length.

With reference to the accompanying figures, the operation of the cutting apparatus 1 will now be described, in the preferred case wherein the cutting of a piece P having a longitudinal extension L1 greater than the longitudinal extension L0 of the operative cutting area 12 is required.

Figure 6:
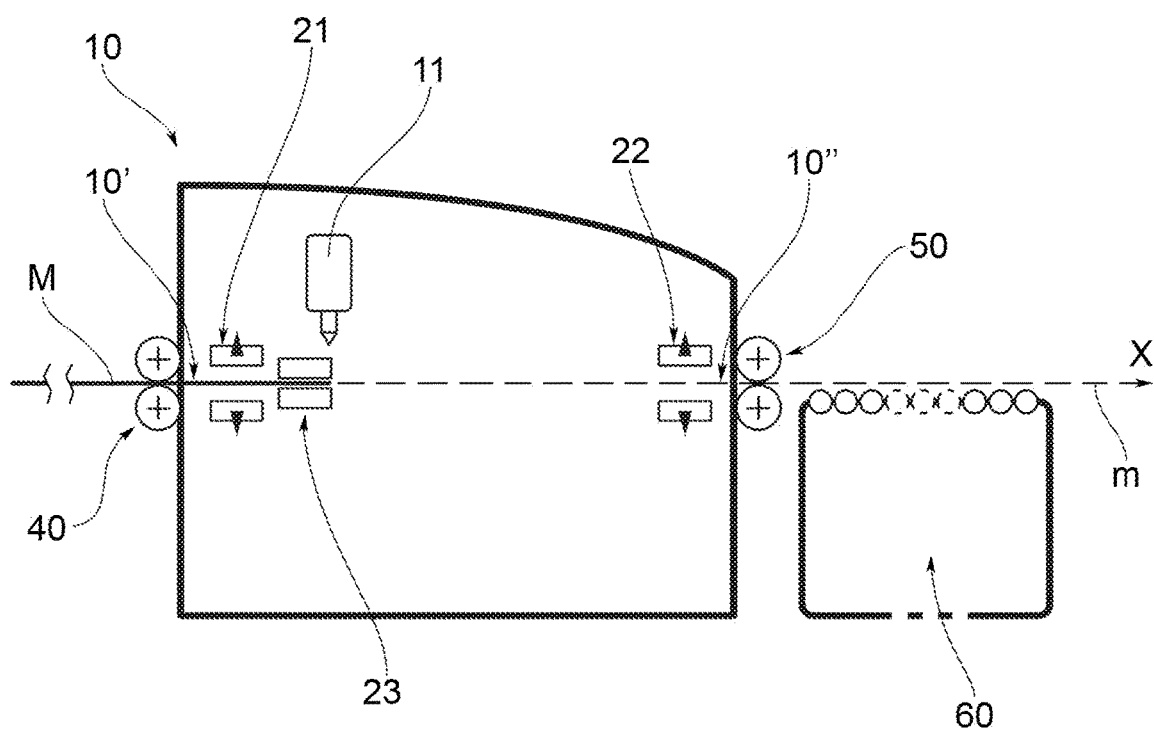

A head portion of the laminar material M wound in coil is initially inserted through the entrance 10' into the cutting station 10 until it reaches the operative cutting area 11. In such a position it is engaged by the first locking device 21 and the third locking device 23 (movable). Initially, the two locking devices 21 and 23 are both actuated in unlocking. Subsequently, the third device 23 is actuated in locking on the material, while the other two devices 21 and 22 are actuated in unlocking in order to allow the laminar material to slide freely through them (FIG. 6).

The third device 23 is made to translate towards the exit 10", pulling with it the first portion of laminar material, which is thus positioned inside the operative cutting area. Once the third device 23 is brought in proximity of the exit 10", near the second device 22, the first device 21 is actuated in locking and the tensioning of the material is performed by means of the third device 23. The cutting step may now take place (FIG. 1).

Figure 2:
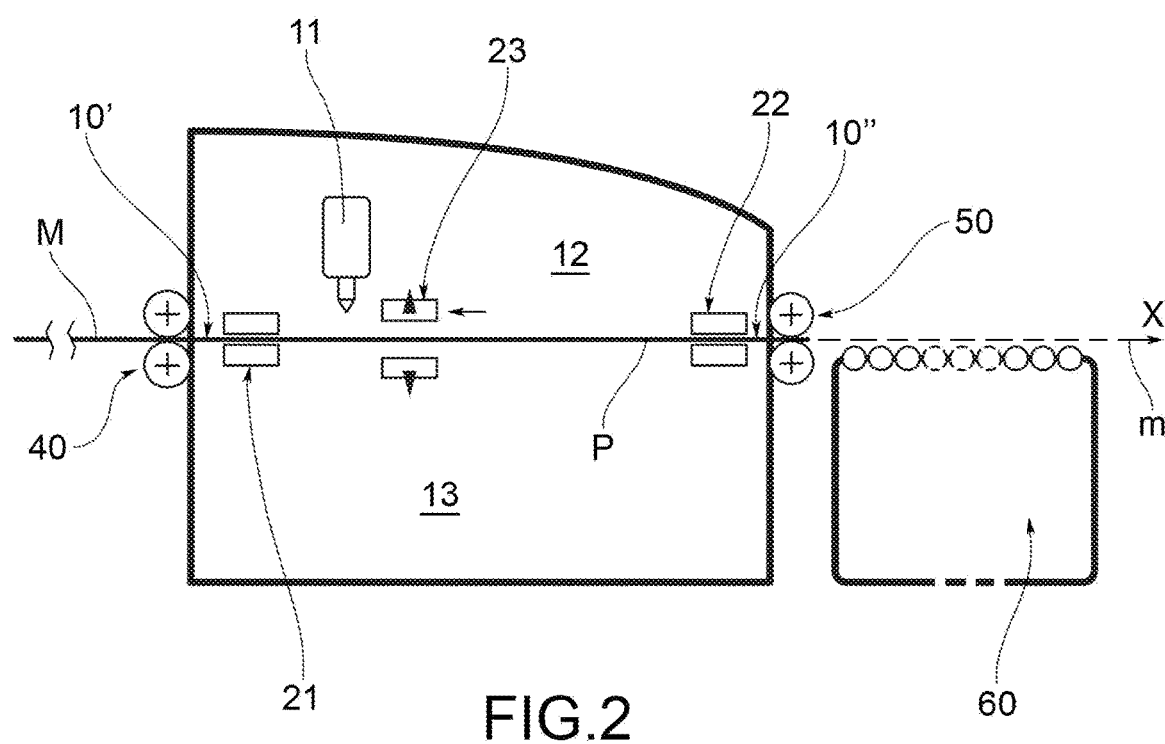
FIGS. 2 to 6 show the apparatus of FIG. 1 in different operational steps.
Figure 3:
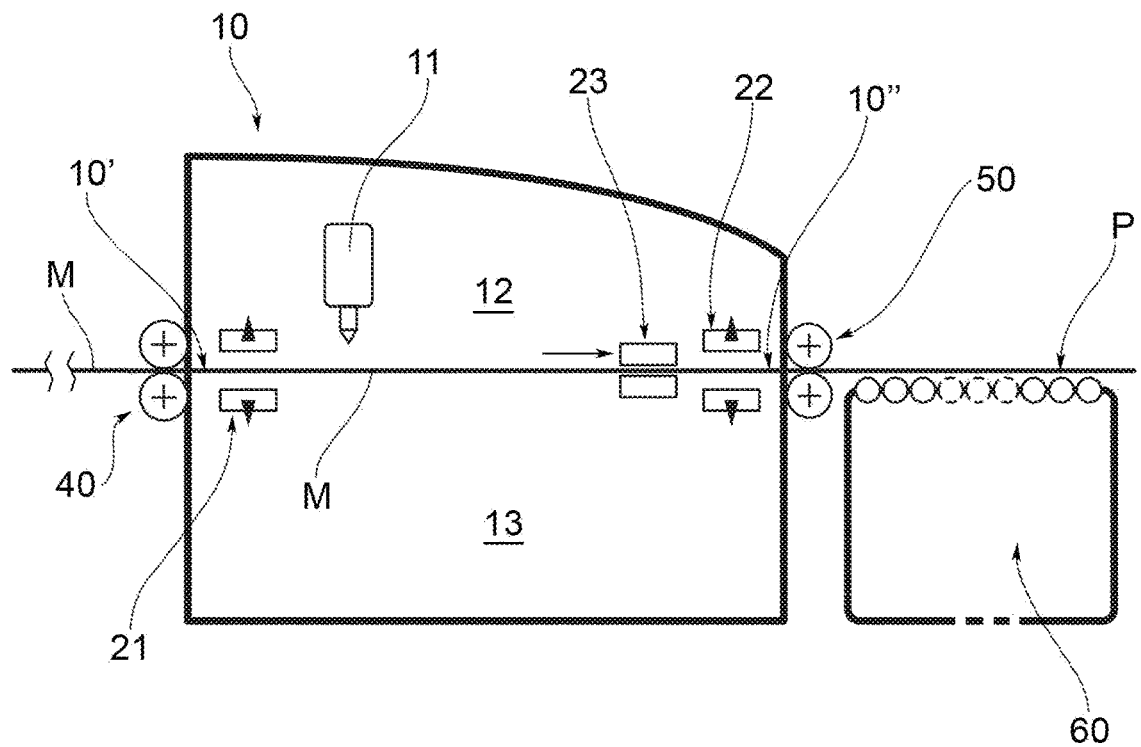

Once the cutting step on the first portion of laminar material has been completed, the third device 23 is actuated in unlocking and translated towards the first device 21, while the second device 22 has been actuated in locking beforehand to keep the laminar material under tension or at least prevent it from bending under its own weight (FIG. 2). Once it has arrived in proximity of the first device 21, the third device 23 is actuated in locking and translated towards the exit in order to pull the machined laminar material therewith, pushing it out of the cutting station 10 onto the support structure 60. During this operation, the other two devices 21 and 22 are actuated in unlocking. In this operation, the extraction means 50 may be actuated to keep the outgoing laminar material on the cutting plane m (FIG. 3).

Figure 4:
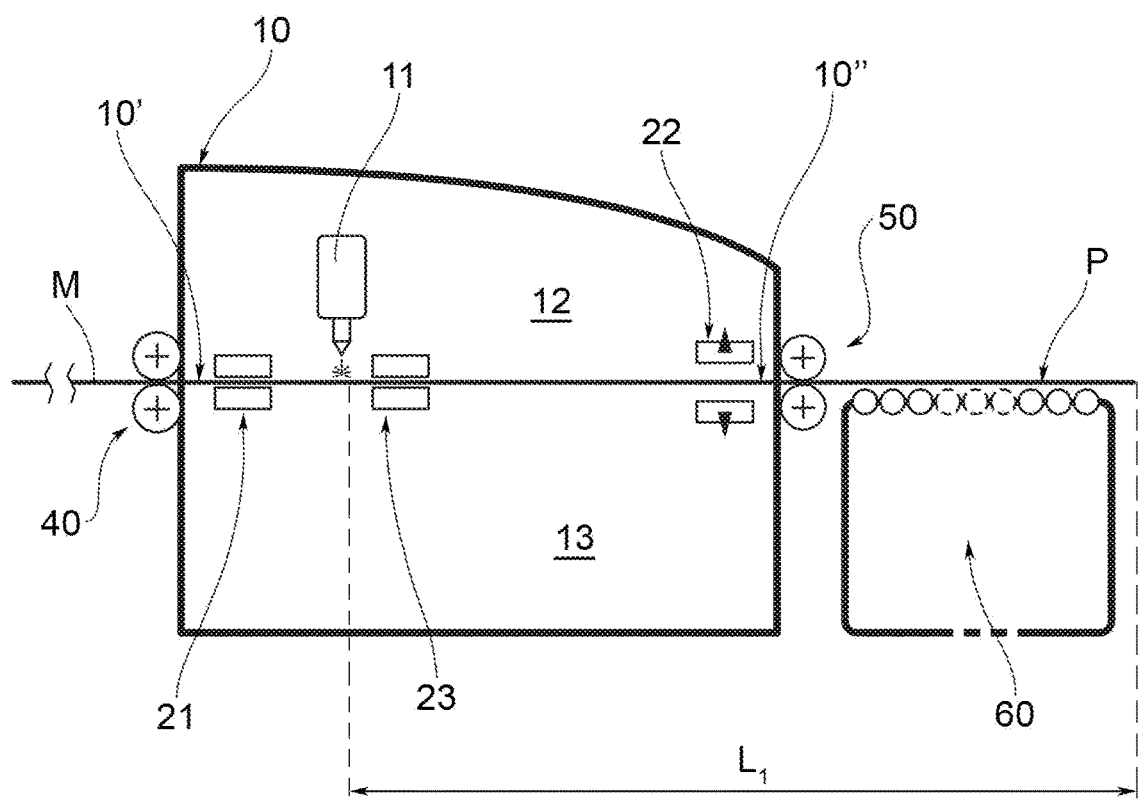

At this point, the first device 21 is actuated in locking; the new portion of laminar material is tensioned and then subjected to cutting. The piece P (machined in two steps, on two consecutive longitudinal portions) is now completed. The third device 23 (actuated in unlocking) is brought in proximity of the first device 21, while the other two devices 21 and 22 are actuated in locking. Once such position has been reached, the third device 23—together with the first device 21—is actuated in locking, while the second device 22 may be actuated in unlocking. The piece P is separated from the rest of the laminar material by means of a transverse cut (FIG. 4).

Figure 5:
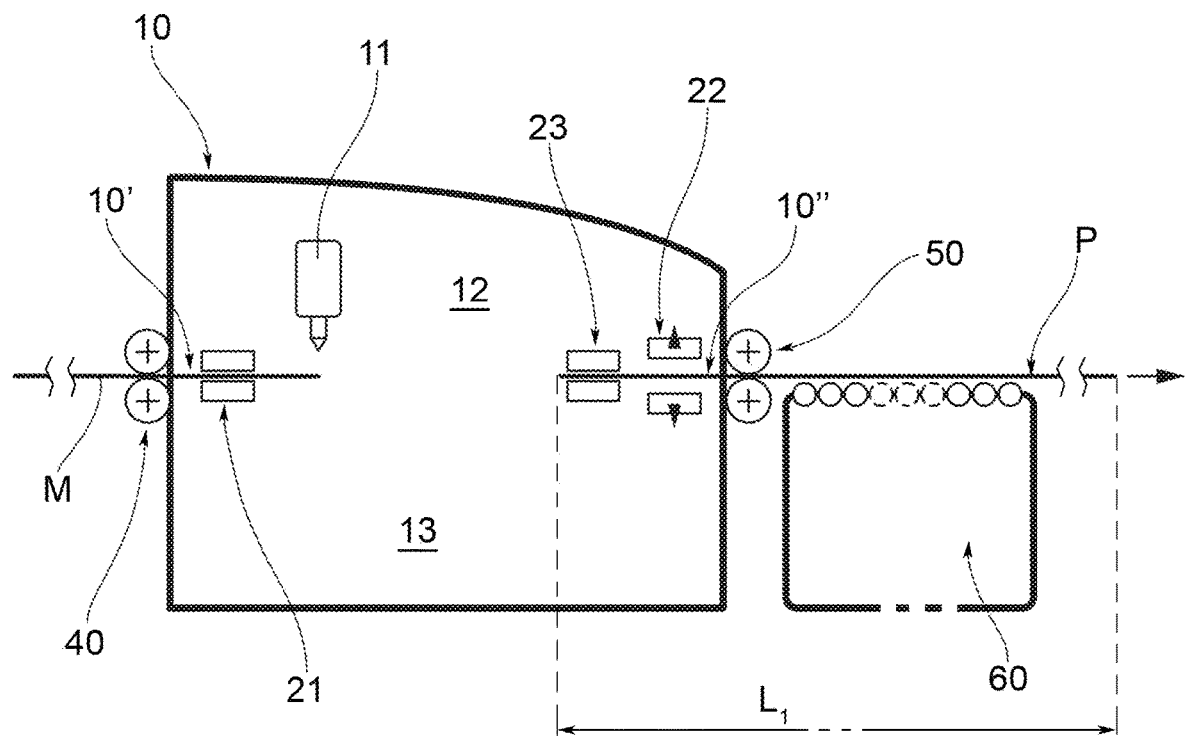

The second and last portion of the piece P may now be moved out of the cutting area 12 by translating the third locking device 23, which is actuated in locking on the material, towards the exit. In this operation, the extraction means 50 may be actuated to keep the outgoing laminar material on the cutting plane m (FIG. 5). The third device 23 may now leave the outgoing material and return to the entrance 10' to take the new laminar material M. The cycle may now start over from the beginning.

The invention allows many advantages already partly described to be obtained.

The apparatus for the laser or plasma cutting of pieces from laminar material wound in coil according to the invention allows format changes of the pieces to be cut to be managed in a flexible way and at the same time keeps the apparatus compact in size, while still performing cutting of the laminar material in suspension.

The cutting apparatus 1 according to the invention may therefore cut pieces P having any longitudinal extension, regardless of the extension in length of the operative cutting area 12. Unlike that which is envisaged in traditional cutting apparatuses, the cutting of a piece P may be distributed over two or more distinct cutting steps, carried out at different times and on different portions of material, but in the same operative cutting area 12.

This keeps the size of the cutting station 10 compact.

The apparatus for the laser or plasma cutting of pieces from laminar material wound in coil according to the invention is easy to manage, since only the cooperation between different devices that are part of the same apparatus is required.

The apparatus for the laser or plasma cutting of pieces from laminar material wound in coil according to the invention is also simple and economical to implement, since it requires the installation of additional components that are not difficult to produce.

The invention thus conceived therefore achieves the foregoing objects.

Obviously, in its practical implementation, it may also be assumed to take on embodiments and configurations other than those described above without, for this reason, departing from the present scope of protection.

Moreover, all details may be replaced by technically equivalent elements, and the dimensions, shapes and materials used may be of any kind according to the need.

The invention claimed is:

1. An apparatus for laser or plasma cutting of pieces from laminar material wound on coils, comprising:
   a cutting station, provided with a housing and at least one laser or plasma cutting head movable within an operative cutting area, which is placed between an entrance and an exit of the housing so that the laminar material is feed into and out of said cutting station in a longitudinal advancement direction of said material and is obtained above a receiving cavity for receiving of the cutting swarf of the laminar material;
   means for positioning a portion of said laminar material in said operative area on a cutting plane placed above said receiving cavity, wherein said means for positioning are suitable to maintain said portion of laminar material blocked on said cutting plane during the cutting operations, suspended in the air and longitudinally stretched over said receiving cavity; and
   an electronic control unit responsible for controlling the operation of said apparatus;
   wherein said means for positioning comprise at least a first, a second and a third locking devices, said first and second locking devices comprising each at least one fixed clamp or a pair of opposing rollers, and a third locking device comprising at least one clamp, each of said first, second and third locking devices is susceptible to act by reversibly locking on a transverse portion of the laminar material and to be passed through by a portion of laminar material placed on said cutting plane, wherein said first, second and third locking devices are arranged in sequence along said longitudinal advancement direction inside the cutting station, wherein the first locking device is arranged in the proximity of said entrance, the second locking device is arranged in proximity of said exit and a third locking device is arranged between said first locking device and said second locking device and at least said third locking device being movable along said longitudinal advancement direction in the space comprised between said first locking device and said second locking device,
   and wherein said apparatus comprises a support structure which is arranged downstream of said cutting station and which defines a support plane for the laminar material leaving the cutting station,
   and wherein said electronic control unit is programmed to coordinate the actuation of the first, second and third locking devices in locking and in unlocking on the laminar material, in such a way that a portion of the laminar material inside the cutting station is kept under tension on the cutting plane by combining the action of the first locking device with the third locking device or with the second locking device, thereby allowing to free the translation of the second locking device or the third locking device with respect to said portion of laminar material, while continuing to maintain the latter under tension.

2. The apparatus according to claim 1, wherein said electronic control unit is programmed to coordinate the action of said at least one cutting head, the actuation of the at least first, second and third locking devices and the longitudinal translational movement of said third locking device, so that, in the case in which the cutting of a piece having a longitudinal extension greater than the longitudinal extension of the operative cutting area is required, the cutting operations of said piece are divided temporally into two or more distinct cutting steps carried out in sequence on two or more subsequent longitudinal portions of the laminar material, which remain connected to each other in a single body and are sequentially pulled inside the operative cutting area and then pulled out of said area by the third locking device which performs a shuttle movement between said entrance and said exit, wherein on the forward travel towards the entrance the third locking device is actuated in unlocking to translate with respect to the laminar material and the other two locking clamps are actuated in locking to keep the portion of material taut on the cutting plane, while on the return travel towards the exit the third locking clamp is actuated in locking to pull the laminar material with it and the first and the second locking devices are actuated in unlocking to allow the free sliding of said laminar material on the cutting plane.

3. The apparatus according to claim 2, wherein said electronic control unit is programmed in such a way that, after completion of the cutting operations on a last portion of said piece, the third locking device is brought back in proximity of the first locking device towards the entrance and the clamps the laminar material, and the cutting head is actuated to perform a transverse cut between the first locking device and the third locking device so as to separate said piece from the upstream laminar material and wherein, after said transverse cutting, the third locking device is translated toward the exit as far as the second locking device, the latter being actuated in unlocking, to push also said last portion of the piece outside the operative cutting area on said support structure.

4. The apparatus according to claim 1, wherein said electronic control unit is programmed so that during a cutting step on a portion of laminar material, the first locking device and the third locking device are both actuated in locking to tension said portion of laminar material in the longitudinal direction and the second locking clamp is instead actuated in unlocking, said third locking device being arranged in proximity to the second locking device.

5. The apparatus according to claim 1, wherein said electronic control unit is programmed to coordinate the actuation of the at least the first, second and third locking devices in locking and unlocking the laminar material and the movement of said third locking device, so that said third locking device is used to drag inside the operative cutting area a free head portion of the laminar material inserted in said first locking device, in such operation the first and second locking devices both being actuated in unlocking to allow the free sliding of the laminar material on the cutting plane.

6. The apparatus according to claim 1, wherein said third locking device consists of at least one clamp slidingly guided parallel to the longitudinal advancement direction of the material by a support structure of the cutting station.

7. The apparatus according to claim 1, wherein said first and said second locking devices clamps each have their own fixed position in said cutting station.

8. The apparatus according to claim 1, wherein the support plane for the laminar material exiting the cutting station defined by said support structure is coplanar with said cutting plane.

9. The apparatus according to claim 1, wherein the support structure arranged downstream of said cutting station consists of a roller table.

10. The apparatus according to claim 1, wherein the support structure arranged downstream of said cutting station has a predefined longitudinal extension depending on the extension in length of the pieces to be machined in said cutting station.

11. The apparatus according to claim 1, comprising upstream of the entrance to the cutting station means for guiding and straightening on the cutting plane the laminar material coming from a coil along the longitudinal advancement direction of the material.

12. The apparatus according to claim 1, comprising downstream of the exit from the cutting station means for extracting the laminar material from said cutting station.

13. The apparatus according to claim 12, wherein said electronic control unit is programmed to coordinate the actuation of said means for extraction with the translational movement of the third locking device in such a way that a portion of laminar material pushed to exit from the operative cutting area by said third locking device is maintained coplanar to the cutting plane by said means for extraction.

14. The apparatus according to claim 1, comprising downstream of the exit from the cutting station at least a pair of extractor rollers for extracting the laminar material from said cutting station.

* * * * *